United States Patent Office 2,769,913
Patented Nov. 6, 1956

2,769,913

DISPLACEMENT FLUID IN SECONDARY PETROLEUM RECOVERY

Roy P. Mazzagatti, Houston, Tex., assignor to The Texas Company, New York, N. Y., a corporation of Delaware No Drawing. Application December 23, 1952, Serial No. 327,689

6 Claims. (Cl. 250—43.5)

The present invention relates to the secondary recovery of petroleum from subsurface oil producing formations wherein an auxiliary displacement fluid such as water or gas is forced into the formation from an injection well to drive and displace the desired subsurface hydrocarbons toward one or more producing wells. More specifically, therefore, the invention is concerned with maximizing production by avoiding by-passing of the desired subsurface hydrocarbon.

In accordance with the present invention, the displacing or repressuring fluid injected into the formation is identified or marked by incorporating therein a beta emitting isotopic element of the class consisting of $C^{14}$ and tritium. The resulting beta active fluid is flooded into the formation from one or more injection wells under pressure. Test samples are regularly taken at one or more producing wells extending into the formation, and the samples are tested for beta activity.

"Break through" of the injected displacing fluid into any production well is immediately indicated by radioactivity of the produced fluids so that the secondary recovery pattern may be appropriately altered to avoid improper use of the displacing fluid and to maximize recovery.

The beta-active isotopic elements may be incorporated in the displacement fluid either in elemental form or in the form of a compound containing the isotope in its structure. Homogeneous dispersion of elemental tritium in a water or brine flood, for example, results from the almost infinitesimally small amounts of tritium which are effective to identify the fluid. Advantageously, however, the radioactive elements are incorporated in the form of compounds thereof, compatible with the formation and with the injection fluid. The term "compatible" as used herein means that the compounds do not react with the injection fluid or with the formation to yield products which remain in the formation. For this reason, polar compounds are preferred.

For example, either of the foregoing isotopic elements may be incorporated in the chemical structure of typical hydrocarbon compounds. Such are particularly effective in so-called gas drive or combination gas-water drive secondary recovery operations using any of the typical repressuring gases such as nitrogen, hydrogen, methane, or the like. In general, they freely enter into homogeneous admixture with the drive gas. While tracers comprising beta-active, normally gaseous hydrocarbons, such as isotopic methane, ethane, propane, butane, etc. are preferred, the heavier hydrocarbons also form homogeneous mixtures with the fluid in the minute concentrations contemplated.

The following beta-active forms of methane, ethane, and acetylene are given by way of illustration: $CH_3T$, $CHT_3$, $CH_3T_2$, $CT_4$, $C^{14}{}_2H_4$, $C^{14}{}_2H_2$, $CC^{14}H_4$, $C_2HT$ and $CC^{14}H_2$. Also contemplated are isotopic carbon monoxide, carbon dioxide, water and other compatible isotopic compounds.

The present invention particularly contemplates the identification of the flood front as respects particular injection wells so that the injected fluid approaching any sampling region can be correlated with the injection point from which it originates. This is realized by differently marking the injection fluid at each point of injection. For example, the injection fluid at one point of injection is identified by addition of tritium, whereas the displacement fluid injected at another point is associated with $C^{14}$. The respective injection streams are accordingly identifiable and distinguishable by a proportional radioactivity detector capable of discriminating between the energy of the electrons admitted by tritium and the different energy of the electrons emitted by $C^{14}$, respectively 0.018 m. e. v. and 0.155 m. e. v.

Also, the respective injection sources may be rendered individually identifiable by incorporating respective radioisotopic compounds which are separable from the injection fluid by specific individual treatments. Radio-active samples collected at a production well which lose their activity after subjection to such treatment, manifestly owe their activity to the compound thus separated.

For example, an injection fluid containing $C^{14}O_2$ is distinguishable by scrubbing a recovered radioactive sample with alkali to effect $CO_2$ removal. If the $CO_2$-free sample exhibits no, or a decreased, beta activity, then it is apparent that the sample originated in the injection fluid containing radioactive carbon dioxide. On the other hand, if the radioactivity is unimpaired by such scrubbing, then it is apparent that it results from some other source of radioactivity.

There are many other suitable compounds of $C^{14}$ and/or tritium capable of being separated from the injection fluid. Among thes are, for example, hydrogen sulfide, ammonia and carbon monoxide. Hydrogen sulfide is selectively separable from the injection fluid by an alkali such as NaOH or KOH. Ammonia may be removed by an acid absorbent such as succinic acid, and CO is recoverable by water-gas-shifting to $CO_2$ which is recoverable as above.

The present invention is of importance in developing vital information concerning subsurface producing horizons, particularly in avoiding by-passing, coning, premature water fingering or encroachment, as well as the undesired flooding of areas of great permeability to the detriment of product-containing formations of lower permeability. By this means, it is possible to recover desired hydrocarbons ahead of the advancing displacement front, thereby realizing maximum recovery.

The contemplated tracing materials are particularly advantageous in that they are effective, as above intimated, in minute concentrations to discriminate as to the source of injected fluid, are in general compatible with the subsurface system and with the injection fluid, are safe to use, possess a sufficiently long life span for secondary recovery purposes, do not naturally occur in the formations in sufficient quantity to impair their present function, are detectable in minute amounts by well developed methods, and are economical in the amounts employed.

The advantage of safety in use follows from the fact that the radioactive isotopes in question are exclusively beta-active, being free from harmful gamma radiation, and, therefore, capable of being handled at the point of injection without risk.

The minuteness of the concentration required for identification purposes is illustrated by the fact that an emission of 4 electrons per second can conservatively be detected using a flow type beta gas counter of, for example, 1000 cc. capacity.

On this basis, 10 million standard cubic feet a day of injection gas, for example, is activated sufficiently for easy detection by the addition of only 0.01 cc. of tritium. This amounts, therefore, to 1 cc. of tritium per billion cubic feet of gas or approximately one part in 28 trillion.

Where the secondary recovery operation occupies any substantial time period, it is preferable to increase the amount of tracer somewhat to allow for decay or unavoidable small losses which may occur.

The tracer material or materials may be continuously added to the injection fluid as it is fed into the formation, or alternatively may be added to the advancing fluid front, after which injection of flooding fluid is continued without added tracer.

This latter method is particularly effective where the injection fluid tends to flow through the formation laterally in a predetermined direction as a stream of more or less restricted cross-section. In such case, the advancing front containing the tracer remains substantially undiluted. On the other hand, where the injected fluid moves radially in all directions, the advancing front may become attenuated, as regards tracer concentration, as it progresses away from the injection well due to its ever increasing front area. In such cases, a correspondingly increased quantity of tracer is advisable.

The injected displacement fluid maintains reservoir pressure and holds dissolved gas in solution so that increase in oil viscosity is avoided, and, as indicated, physically displaces oil which would otherwise remain in the reservoir.

Therefore, an increased rate of production as well as increased ultimate hydrocarbon recovery ensue. The present invention avoids needless pumping cost and loss of valuable hydrocarbons by-passed in the reservoir, the appearance of the auxiliary drive fluid in a producing oil immediately indicating such a condition. It is understood, of course, that the usual producing well delivers gas and water with the liquid oil, so that presence of displacement fluid cannot be confirmed in the absence of specific identification, such as herein disclosed.

In field operation the produced product from the reservoir is usually placed in a common storage tank. Samples of gas, oil and water so produced are periodically tested, and when any of these fluids manifests radioactive beta activity, samples taken from each of the producing wells are likewise tested to determine from which well the radioactive fluid is being produced.

In accordance with one example of an operation in accordance with the present invention, natural gas is injected into a formation through a plurality of injection wells at a total rate of about one million standard cubic feet per day. Prior to injection the methane is mixed with 0.001 cc. gaseous tritium. Intimate admixture is effected by first incorporating the tritium into about 250 cubic feet of methane, causing uniform admixture and continuously metering the resulting mixture into the stream of injection gas as it is pumped into the well. Injection of the thus identified recovery fluid is continued for about a week, at which time samples of gas from a producing well about 1000 feet away from the injection well exhibit beta activity. Accordingly production is terminated at the production point, the well sealed and production continued at other wells at which no radioactivity is evident.

In the same manner, in a water flood project the tritium, per se, or, advantageously tritium oxide ($T_2O$) is added in equivalent amount to the injected water or brine, samples from the producing wells being tested in the same manner.

As above indicated, testing is best carried out by means of a flow type beta counter, as, for example, a Libby-Kulp, screen wall counter, of well known and conventional design, which, per se, forms no part of the present invention, and is, therefore, not described in further detail. Measurement may also be made by means of a thin wall type beta counter.

Distinction between injection streams identified by tritium and $C^{14}$ respectively, is readily realized by means of a proportional radioactivity detector which likewise is well known to those skilled in the art, and, therefore, need not be detailed herein.

As an example of separately identifying produced displacement fluid from a plurality of injection wells as to which injection point the fluid is originating, reference is made to a secondary recovery system involving three spaced injection wells. Each of the wells is supplied with natural gas under pressure.

The stream of natural gas entering well No. 1 contains tritium; the stream entering well No. 2 contains methane, the carbon atom of which is $C^{14}$; and the stream to well No. 3 contains radioactive carbon dioxide made from $C^{14}$.

Samples are taken from a production well spaced a distance of 400 feet away, and after three days these samples exhibit beta activity, showing a break through of injection gas. The samples are scrubbed with a sodium hydroxide solution to remove carbon dioxide, the scrubbed samples exhibiting no beta activity, thereby establishing that the origin of the produced gas is injection well No. 3. Manifestly, if the beta activity still persists, then testing with proportional radioactivity counter would discriminate as to origin as between wells Nos. 1 and 2.

Obviously, many modifications and variations of the invention as herein set forth may be made without departing from the original spirit and scope thereof, and only such limitations should be imposed as are indicated in the appended claims.

I claim:

1. In the secondary recovery of petroleum from a subsurface, oil bearing formation by injecting a secondary oil displacing, recovery fluid into said formation at a plurality of injection points to promote flow of said oil toward at least one producing well, the improvement which comprises adding to the recovery fluid at at least one injection point a detectable amount of the beta-active, isotopic element $C^{14}$, adding to the recovery fluid supplied at other of said injection points tritium in a detectable amount, testing the fluids withdrawn from said producing well by means of a proportional radioactivity counter effective to discriminate between the electron energy of tritium and $C^{14}$ as an indication of the arrival of the recovery fluid in the production well, effective to establish the origin of the recovery fluid arriving at the production well.

2. In the secondary recovery of petroleum hydrocarbons from a subsurface oil producing formation wherein streams of displacing fluid are injected into said subsurface formation at a plurality of spaced points to displace desired hydrocarbons toward one or more production wells remote from said points of injection, the method of identifying the displacing fluid arriving at a production well as to its point of injection, which comprises adding to each of the injected streams at said several injection points a respectively different compound comprising a beta emitting isotopic element of the class consisting of $C^{14}$ and tritium, at least one of said compounds being selectively separable from said displacing fluid, taking samples from said producing well, testing said samples for beta activity resulting from the presence of said isotopic element as an indication of arrival of displacing fluid at the well, treating such radioactive sample for the selective separation of said compound, and thereafter testing said sample for beta activity to determine whether the activity originates with said compound.

3. In the secondary recovery of hydrocarbons from a subsurface producing formation wherein streams of displacing fluid are injected into said subsurface formation at a plurality of spaced points to force desired hydrocarbons toward one or more production wells remote from said point of injection, the method of identifying displacing fluid arriving at said production well as to its point of injection which comprises adding to said injected streams a beta emitting isotopic element of the class consisting of $C^{14}$ and tritium, at least one of said streams comprising a compound of such beta emitting isotopic element which is selectively separable from said displacing fluid, the remaining of the injected material being freed from said compound, taking samples from said producing well, testing said samples for beta activity as an indication of the arrival of displacing fluid at the well, treating said radioactive sample for selective separation of said compound, and thereafter testing said sample for radioactivity to determine whether radioactivity originates with said compound.

4. In the secondary recovery of hydrocarbons from a subsurface producing formation wherein a plurality of streams of displacing fluid are injected into said subsurface formation at spaced points to displace desired hydrocarbons toward one or more production wells remote from said point of injection, the method of identifying the displacing fluid arriving at the producing well as to its point of injection which comprises adding to each of the injected streams respectively at the said several points of injection a separately identifiable material comprising a beta emitting isotopic element of the class consisting of $C^{14}$ and tritium, taking samples from said producing well, testing said samples for beta activity resulting from the presence of said isotopic element as an indication of arrival of displacing fluid at the well and testing each radioactive sample as to its separately identifiable source.

5. A method in accordance with claim 4 wherein said element is $C^{14}$.

6. A method in accordance with claim 4 wherein said element is tritium.

References Cited in the file of this patent

UNITED STATES PATENTS

| | | |
|---|---|---|
| 2,390,931 | Fearon | Dec. 11, 1945 |
| 2,429,577 | French | Oct. 21, 1947 |
| 2,451,520 | Teplitz | Oct. 19, 1948 |

OTHER REFERENCES

Radioactivity and Nuclear Physics, Cork, 1950, published by Van Nostrand Co., Inc., New York, N. Y., second edition, pages 267–268.